(12) United States Patent
Lamers et al.

(10) Patent No.: US 9,704,140 B2
(45) Date of Patent: *Jul. 11, 2017

(54) WELDING SYSTEM PARAMETER COMPARISON SYSTEM AND METHOD

(71) Applicant: ILLINOIS TOOL WORKS INC., Glenview, IL (US)

(72) Inventors: Nathan John Lamers, Appleton, WI (US); Nathan Gerald Leiteritz, Greenville, WI (US); Knut Norman Froland, Green Bay, WI (US); Todd Earl Holverson, Appleton, WI (US); Gregory David Popp, Freedom, WI (US); Caleb Robert Krisher, Appleton, WI (US); Michael Anthony Gill, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 258 days.

This patent is subject to a terminal disclaimer.

(21) Appl. No.: 14/316,219

(22) Filed: Jun. 26, 2014

(65) Prior Publication Data
US 2015/0012865 A1    Jan. 8, 2015

Related U.S. Application Data

(60) Provisional application No. 61/842,845, filed on Jul. 3, 2013.

(51) Int. Cl.
*G06F 15/00* (2006.01)
*G06F 13/00* (2006.01)
*G06Q 10/00* (2012.01)

(52) U.S. Cl.
CPC .............. *G06Q 10/20* (2013.01); *Y02P 90/30* (2015.11)

(58) Field of Classification Search
CPC ........................... G06F 3/04812; G06F 9/4446
See application file for complete search history.

(56) References Cited

U.S. PATENT DOCUMENTS 4,825,038 A    4/1989 Smartt
6,486,439 B1    11/2002 Spear
(Continued)

FOREIGN PATENT DOCUMENTS

CN    1778990    5/2006
CN    101978389    2/2011
(Continued)

OTHER PUBLICATIONS

International Search Report from PCT application No. PCT/US2014/045047, dated Jun. 3, 2015, 15 pgs.
(Continued)

*Primary Examiner* — Kevin Nguyen
(74) *Attorney, Agent, or Firm* — McAndrews, Held & Malloy, Ltd.

(57) ABSTRACT

A metal fabrication resource performance monitoring method, includes accessing data representative of a parameter sampled during a metal fabrication operation of a metal fabrication resource, the resource being selectable by a user from a listing of individual and groups of resources. Via at least one computer processor, the accessed parameter is processed to determine an analyzed system parameter, and a user viewable dashboard page is populated with graphical indicia representative of the analyzed system parameter, and transmitted the user viewable dashboard page to a user.

30 Claims, 13 Drawing Sheets

(56) References Cited

U.S. PATENT DOCUMENTS

| | | | |
|---|---|---|---|
| 6,624,388 B1* | 9/2003 | Blankenship | B23K 9/1062 |
| | | | 219/130.5 |
| 6,636,776 B1 | 10/2003 | Barton | |
| 6,797,921 B1 | 9/2004 | Niedereder | |
| 6,809,292 B2 | 10/2004 | Spear | |
| 6,858,817 B2 | 2/2005 | Blankenship | |
| 6,924,459 B2 | 8/2005 | Spear | |
| 7,041,936 B2 | 5/2006 | Oberzaucher | |
| 7,643,890 B1 | 1/2010 | Hillen | |
| 7,908,302 B1 | 3/2011 | Nagaralu | |
| 2004/0099648 A1 | 5/2004 | Hu | |
| 2004/0262279 A1 | 12/2004 | Spear | |
| 2005/0133488 A1 | 6/2005 | Blankenship | |
| 2008/0078811 A1* | 4/2008 | Hillen | B23K 9/095 |
| | | | 228/101 |
| 2008/0149686 A1 | 6/2008 | Daniel | |
| 2009/0173726 A1 | 7/2009 | Davidson | |
| 2009/0234483 A1* | 9/2009 | Leko | B23K 9/0953 |
| | | | 700/110 |
| 2009/0313549 A1 | 12/2009 | Casner | |
| 2009/0327035 A1 | 12/2009 | Allard | |
| 2010/0224610 A1 | 9/2010 | Wallace | |
| 2010/0257228 A1 | 10/2010 | Staggs | |
| 2010/0299185 A1 | 11/2010 | Caro | |
| 2011/0114615 A1 | 5/2011 | Daniel | |
| 2011/0117527 A1 | 5/2011 | Conrardy | |
| 2011/0172796 A1 | 7/2011 | Sohmshetty | |
| 2012/0136692 A1 | 5/2012 | Ohishi | |
| 2012/0193330 A1 | 8/2012 | Edwards | |
| 2012/0226478 A1 | 9/2012 | Bender | |
| 2013/0075380 A1 | 3/2013 | Albrech | |
| 2014/0277684 A1 | 9/2014 | Lamers | |
| 2014/0278242 A1 | 9/2014 | Lamers | |
| 2014/0278243 A1 | 9/2014 | Lamers | |
| 2015/0121309 A1* | 4/2015 | Reed | G06F 3/0481 |
| | | | 715/824 |

FOREIGN PATENT DOCUMENTS

| | | |
|---|---|---|
| CN | 102922089 | 2/2013 |
| EP | 1295673 A1 | 3/2003 |
| EP | 1958738 | 8/2008 |
| GB | 2454232 | 5/2009 |
| JP | H1147950 | 2/1999 |
| JP | 2003211378 A | 7/2003 |
| KR | 20120017189 | 2/2012 |
| WO | 02058878 A1 | 8/2002 |
| WO | 2012000650 | 1/2012 |

OTHER PUBLICATIONS

International Search Report from PCT application No. PCT/US2014/017862 dated May 8, 2014, 13 pgs.

"How to Measure Performance—A Handbook of Techniques and Tools," U.S. Department of Energy, Oct. 1, 1995, http://www.orau.gov/pbm/handbook/handbook_all.pdf.

International Search Report from PCT application No. PCT/US2014/020920 dated May 12, 2014, 11 pgs.

Gilsinn, Jim et al.: "A Welding Cell That Supports Remote Collaboration", Ninth International Conference on Computer Technology in Welding, Sep. 30, 1999.

International Search Report from PCT application No. PCT/US2014/017863 dated May 12, 2014, 21 pgs.

International Search Report from PCT application No. PCT/US2014/45049, dated Jan. 29, 2015, 9 pgs.

* cited by examiner

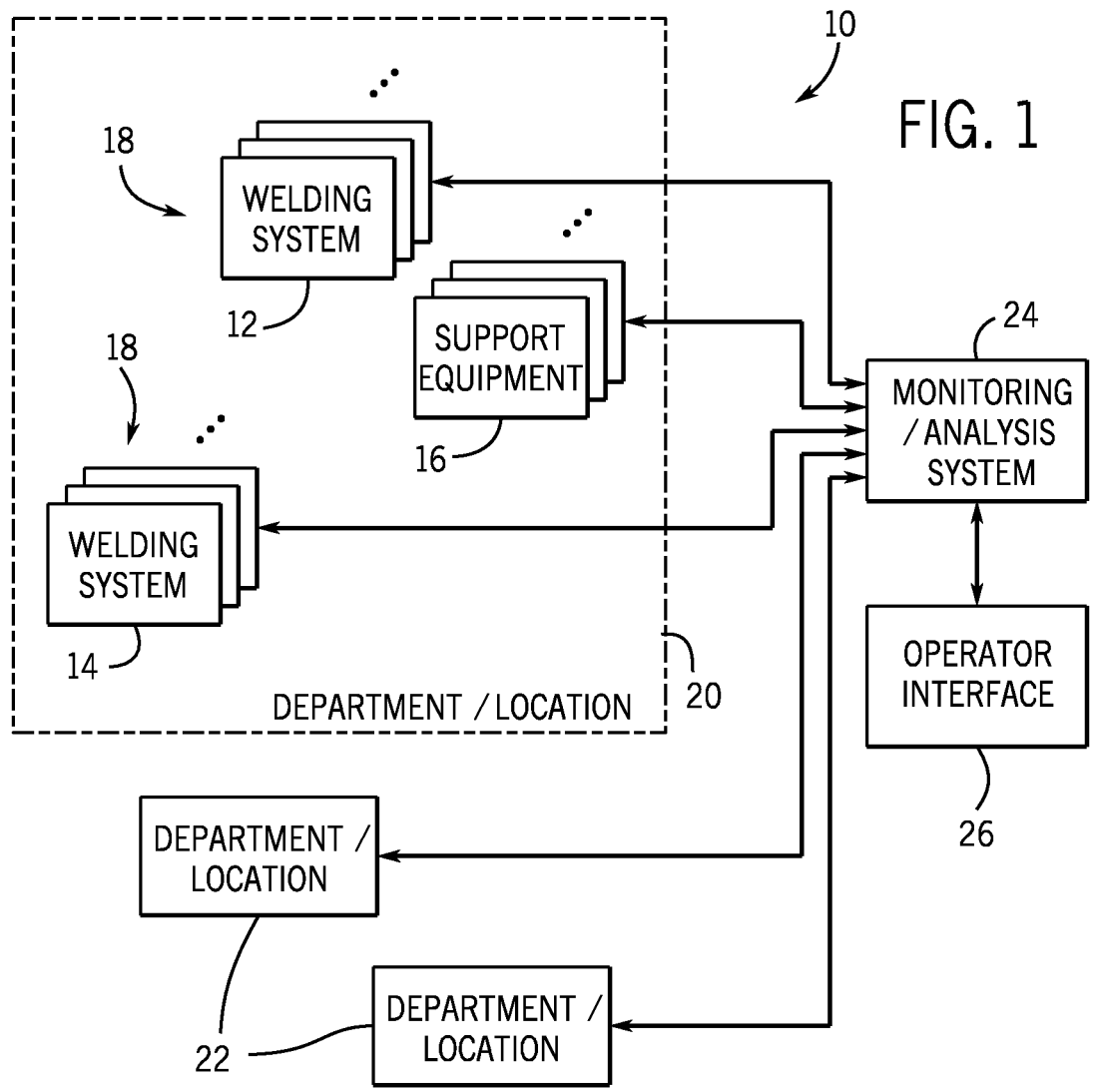
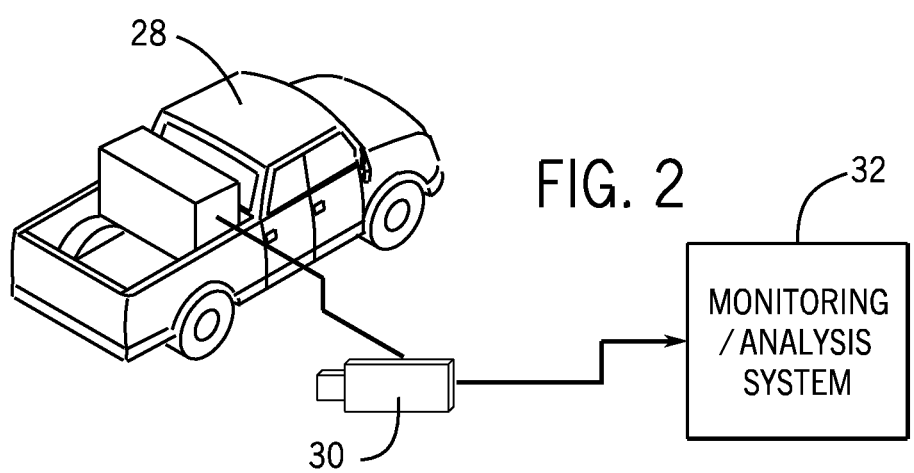

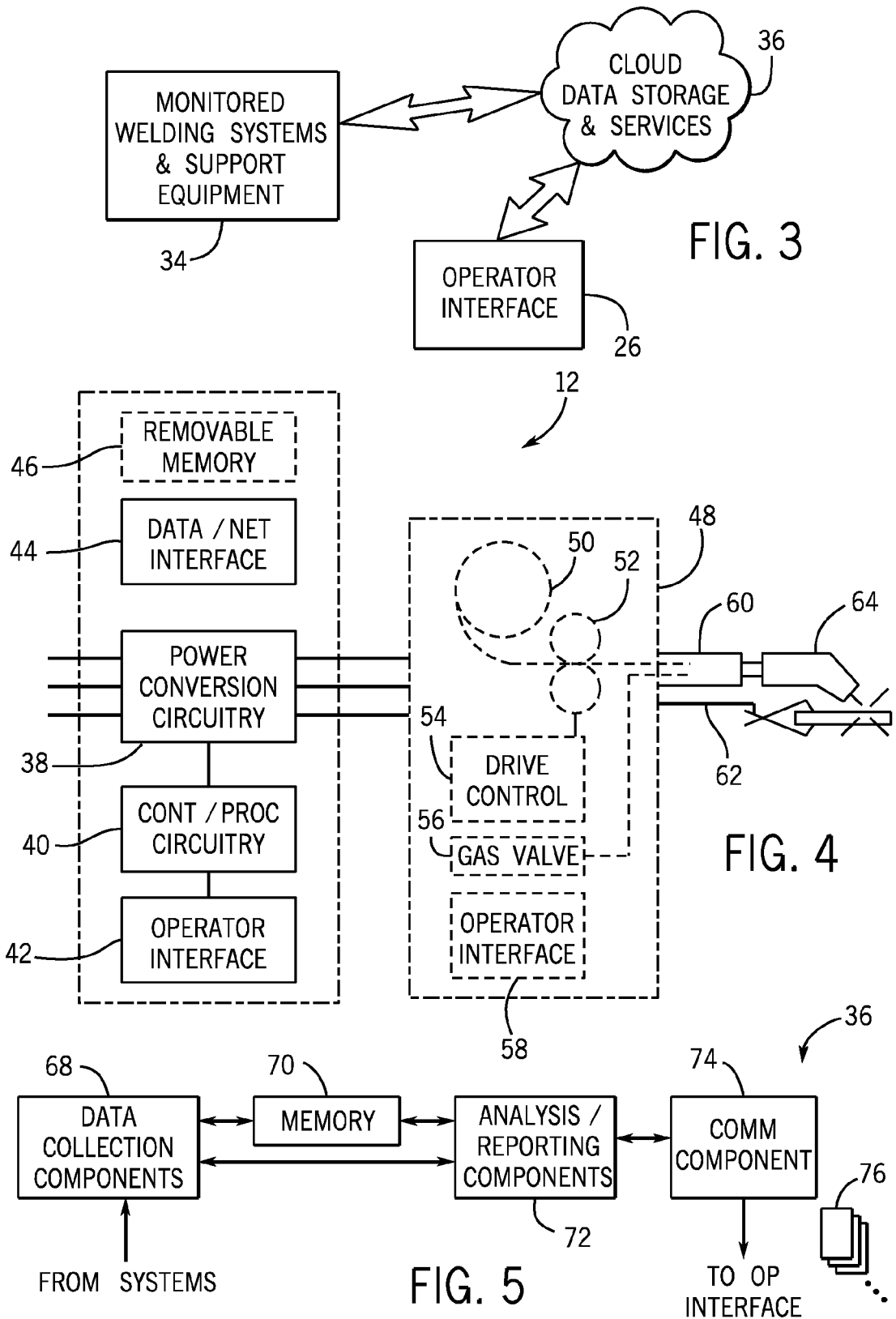

FIG. 10

WELDING SYSTEM PARAMETER COMPARISON SYSTEM AND METHOD

CROSS-REFERENCE TO RELATED APPLICATION

This application claims priority from and the benefit of U.S. Provisional Application Ser. No. 61/842,845, entitled "WELDING SYSTEM PARAMETER COMPARISON SYSTEM AND METHOD," filed Jul. 3, 2013, which is hereby incorporated by reference in its entirety for all purposes.

BACKGROUND

The invention relates generally to metal fabrication including heating systems, cutting systems, welding systems and support equipment for heating, cutting, and welding operations. In particular, the invention relates to techniques for determining and presenting parameters from acquired data from such systems.

A wide range of welding systems have been developed, along with ancillary and support equipment for various fabrication, repair, and other applications. For example, welding systems are ubiquitous throughout industry for assembling parts, structures and sub-structures, frames, and many components. These systems may be manual, automated or semi-automated. A modern manufacturing and fabrication entity may use a large number of metal fabrication systems, and these may be grouped by location, task, job, and so forth. Smaller operations may use metal fabrication systems from time to time, but these are often nevertheless critical to their operations. For some entities and individuals, metal fabrication systems may be stationary or mobile, such as mounted on carts, trucks, and repair vehicles. In all of these scenarios it is increasingly useful to set performance criteria, monitor performance, analyze performance, and, wherein possible, report performance to the operator and/or to management teams and engineers. Such analysis allows for planning of resources, determinations of prices and profitability, scheduling of resources, enterprise-wide accountability, among many other uses.

Systems designed to gather, store, analyze and report welding system performance have not, however, reached a point where they are easily and effectively utilized. In some entities limited tracking of welds, weld quality, and system and operator performance may be available. However, these do not typically allow for any significant degree of analysis, tracking or comparison. Improvements are needed in such tools. More specifically, improvements would be useful that allow for data to be gathered at one or multiple locations and from one or multiple systems, analysis performed, and reports generated and presented at the same or other locations. Other improvements might include the ability to retrospectively review performance, and to see performance compared to goals and similar systems across groups and entities.

BRIEF DESCRIPTION

The present disclosure sets forth systems and methods designed to respond to such needs. In accordance with certain aspects of the disclosure, a metal fabrication resource performance monitoring method, includes accessing data representative of a parameter sampled during a metal fabrication operation of a metal fabrication resource, the resource being selectable by a user from a listing of individual and groups of resources. Via at least one computer processor, the accessed parameter is processed to determine an analyzed system parameter, and a user viewable dashboard page is populated with graphical indicia representative of the analyzed system parameter, and transmitted the user viewable dashboard page to a user.

Also disclosed is a metal fabrication resource performance monitoring system, including a communications component that in operation accesses data representative of a parameter sampled during a metal fabrication operation of a metal fabrication resource, the resource being selectable by a user from a listing of individual and groups of resources. At least one computer processor processes the accessed parameter to determine an analyzed system parameter, and populates a user viewable dashboard page with graphical indicia representative of the analyzed system parameter. A transmission component transits the user viewable dashboard page to a user.

DRAWINGS

These and other features, aspects, and advantages of the present invention will become better understood when the following detailed description is read with reference to the accompanying drawings in which like characters represent like parts throughout the drawings, wherein:

FIG. 1 is a diagrammatical representation of exemplary monitoring system for gathering information, storing information, analyzing the information, and presenting analysis results in accordance with aspects of the present disclosure, here applied to a large manufacturing and fabrication entity;

FIG. 2 is a diagrammatical view of an application of the system for a single or mobile welding system with which the techniques may be applied;

FIG. 3 is a diagrammatical representation of an exemplary cloud-based implementation of the system;

FIG. 4 is a diagrammatical view of an exemplary welding system of the type that might be monitored and analyzed in accordance with the techniques;

FIG. 5 is a diagrammatical representation of certain functional components of the monitoring and analysis system;

FIG. 10 is an exemplary web page view listing historical welds that may be analyzed and presented;

DETAILED DESCRIPTION

Figure 6:
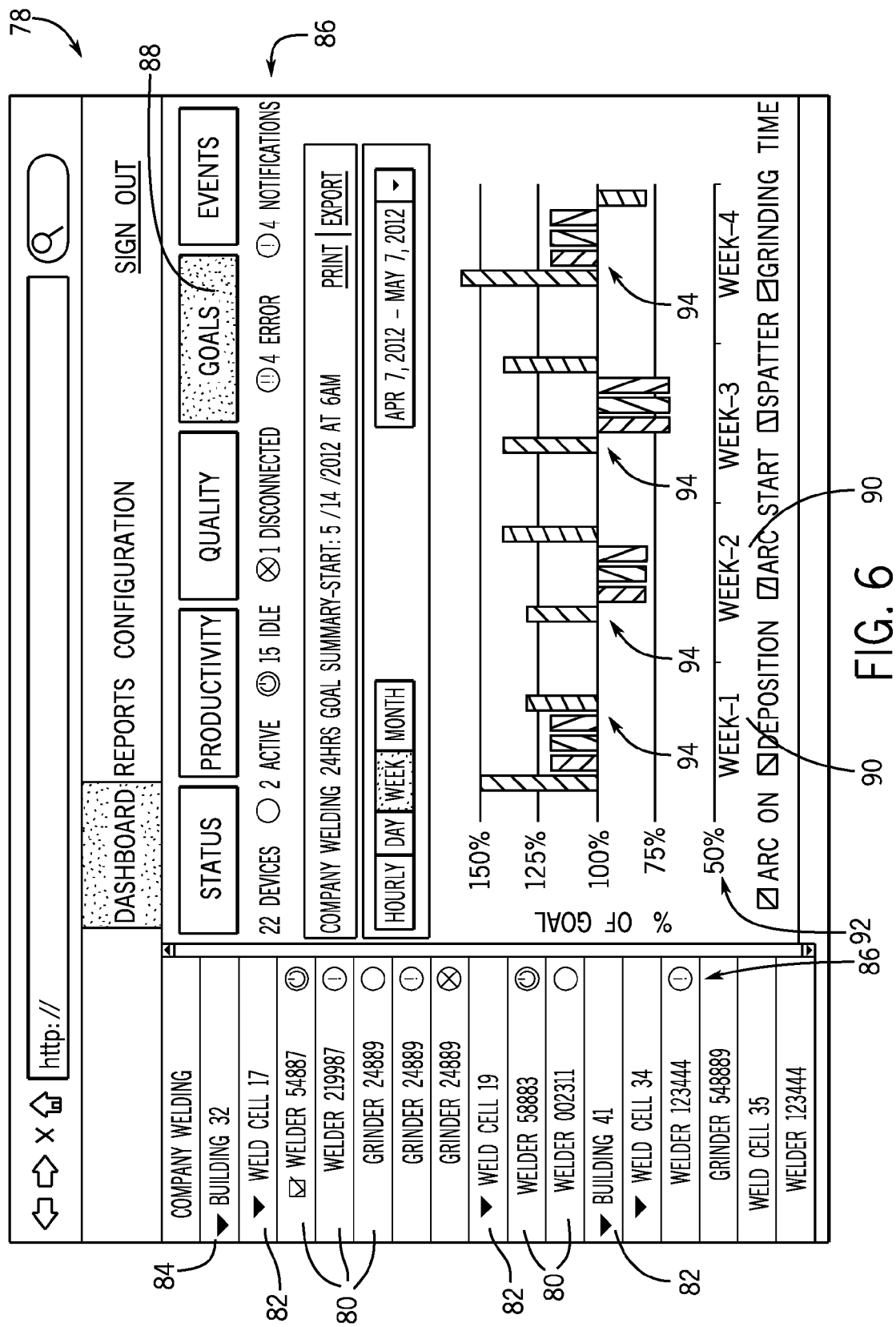
FIG. 6 is an exemplary web page view for reporting of a goals and performance of welding systems via the system.

As illustrated generally in FIG. 1, a monitoring system 10 allows for monitoring and analysis of one or multiple metal fabrication systems and support equipment. In this view, multiple welding systems 12 and 14 may be interacted with, as may be support equipment 16. The welding systems and support equipment may be physically and/or analytically grouped as indicated generally by reference numeral 18. Such grouping may allow for enhanced data gathering, data analysis, comparison, and so forth. As described in greater detail below, even where groupings are not physical (i.e., the systems are not physically located near one another), highly flexible groupings may be formed at any time through use of the present techniques. In the illustrated embodiment, the equipment is further grouped in a department or location as indicated by reference numeral 20. Other departments and locations may be similarly associated as indicated by reference numeral 22. As will be appreciated by those skilled in the art, in sophisticated manufacturing and fabrication entities, different locations, facilities, factories, plants, and so forth may be situated in various parts of the same country, or internationally. The present techniques allow for collection of system data from all such systems regardless of their location. Moreover, the groupings into such departments, locations and other equipment sets are highly flexible, regardless of the actual location of the equipment.

In general, as represented in FIG. 1, the system includes a monitoring/analysis system 24 that communicates with the monitoring welding systems and support equipment, and that can collect information from these when desired. A number of different scenarios may be envisaged for accessing and collecting the information. For example, certain welding systems and support equipment will be provided with sensors, control circuitry, feedback circuits, and so forth that allow for collection of welding parameter data. Some details of such systems are described below. Where system parameters such as arc on time are analyzed, for example, data may be collected in each system reflecting when welding arcs are established and times during which welding arcs are maintained. Currents and voltages will commonly be sensed and data representative of these will be stored. For support equipment, such as grinders, lights, positioners, fixtures, and so forth, different parameters may be monitored, such as currents, switch closures, and so forth.

As noted, many systems will be capable of collecting such data and storing the data within the system itself. In other scenarios, local networks, computer systems, servers, shared memory, and so forth will be provided that can centralize at least at some extent the data collected. Such networks and support components are not illustrated in FIG. 1 for clarity. The monitoring/analysis system 24, then, may collect this information directly from the systems or from any support component that themselves collect and store the data. The data will typically be tagged with such identifying information as system designations, system types, time and date, part and weld specification, where applicable, operator and/ or shift identifications, and so forth. Many such parameters may be monitored on a regular basis and maintained in the system. The monitoring/analysis system 24 may itself store such information, or may make use of extraneous memory.

As described more fully below, the system allows for grouping of the information, analysis of the information, and presentation of the information via one or more operator interfaces 26. In many cases the operator interface may comprise a conventional computer workstation, a handheld device, a tablet computer, or any other suitable interface. It is presently contemplated that a number of different device platforms may be accommodated, and web pages containing useful interfaces, analysis, reports, and the like will be presented in a general purpose interface, such as a browser. It is contemplated that, although different device platforms may use different data transmission and display standards, the system is generally platform-agnostic, allowing reports and summaries of monitored and analyzed data to be requested and presented on any of a variety of devices, such as desktop workstations, laptop computers, tablet computers, hand-held devices and telephones, and so forth. The system may include verification and authentication features, such as by prompting for user names, passwords, and so forth.

The system may be designed for a wide range of welding system types, scenarios, applications, and numbers. While FIG. 1 illustrates a scenario that might occur in a large manufacturing or fabrication facility or entity, the system may equally well applied to much smaller applications, and even to individual welders. As shown in FIG. 2, for example, even welders that operate independently and in mobile settings may be accommodated. The application illustrated of FIG. 2 is an engine-driven generator/welder 28 provided in a truck or work vehicle. In these scenarios, it is contemplated that data may be collected by one of several mechanisms. The welder itself may be capable of transmitting the data wirelessly via its own communications circuitry, or may communicate data via a device connected to the welding system, such as communications circuits within the vehicle, a smart phone, a tablet or laptop computers, and so forth. The system could also be tethered to a data collection point when it arrives at a specified location. In the illustration of FIG. 2 a removable memory device 30, such as a flash drive may be provided that can collect the information from the system and move the information into a monitoring/analysis system 32. In smaller applications of this type, the system may be particularly designed for reduced data sets, and analysis that would be more useful to the welding operators and entities involved. It should be apparent to those skilled in the art, then, that the system can be scaled and adapted to any one of a wide range of use cases.

FIG. 3 illustrates an exemplary implementation, for example, which is cloud-based. This implementation is presently contemplated for many scenarios in which data collection, storage, and analysis are performed remotely, such as on a subscription or paid service basis. Here the monitored welding system and support equipment 34 communicate directly and indirectly with one or more cloud data storage and services entities 36. The entities may take any desired form, and significant enhancements in such services are occurring and will continue to occur in coming years. It is contemplated, for example, that a third party provider may contract with a fabricating or manufacturing entity to collect information from the systems, store the information off-site, and perform processing on the information that allows for the analysis and reporting described below. The operator interfaces 26 may be similar to those discussed above, but would typically be addressed to ("hit") a website for the cloud-based service. Following authentication, then, web pages may be served that allow for the desired monitoring, analysis and presentation. The cloud-based services would therefore include components such as communications devices, memory devices, servers, data processing and analysis hardware and software, and so forth.

As noted above, many different types and configurations of welding systems may be accommodated by the present techniques. Those skilled in the welding arts will readily appreciate that certain such systems have become standards throughout industry. These include, for example, systems commonly referred to as gas metal arc welding (GMAW), gas tungsten gas arc welding (GTAW), shielded metal arc welding (SMAW), submerged arc welding (SAW), laser, and stud welding systems to mention only a few. All such systems rely on application of energy to workpieces and electrodes to at least partially melt and fuse metals. The systems may be used with or without filler metal, but most systems common in industry do use some form of filler metal which is either machine or hand fed. Moreover, certain systems may be used with other materials than metals, and these systems, too, are intended to be serviced where appropriate by the present techniques.

By way of example only, FIG. 4 illustrates an exemplary welding system 12, in this case a MIG welding system. The system includes a power supply that receives incoming power, such as from a generator or the power grid and converts the incoming power to weld power. Power conversion circuitry 38 allows for such conversion, and will typically include power electronic devices that are controlled to provide altering current (AC), direct current, pulsed or other waveforms as defined by welding processes and procedures. The power conversion circuitry will typically be controlled by control and processing circuitry 40. Such circuitry will be supported by memory (not separately shown) that stores welding process definitions, operator-set parameters, and so forth. In a typical system, such parameters may be set via an operator interface 42. The systems will include some type of data or network interface as indicated at reference numeral 44. In many such systems this circuitry will be included in the power supply, although it could be located in a separate device. The system allows for performing welding operations, collecting both control and actual data (e.g., feedback of voltages, currents, wire feed speeds, etc.). Where desired, certain of this data may be stored in a removable memory 46. In many systems, however, the information will be stored in the same memory devices that support the control and processing circuitry 40.

In the case of a MIG system, a separate wire feeder 48 may be provided. The components of the wire feeder are illustrated here in dashed lines because some systems may optionally use wire feeders. The illustrated system, again, intended only to be exemplary. Such wire feeders, where utilized typically include a spool of welding wire electrode wire 50 and a drive mechanism 52 that contacts and drives the wire under the control of a drive control circuitry 54. The drive control circuitry may be set to provide a desired wire feed speed in a conventional manner. In a typical MIG system a gas valve 56 will allow for control of the flow of the shield and gas. Setting on the wire feeder may be made via an operator interface 58. The welding wire, gas, and power is provided by a weld cable as indicated diagrammatically at reference numeral 60, and a return cable (sometimes referred to as a ground cable) 62. The return cable is commonly coupled to a workpiece via a clamp and the power, wire, and gas supplied via the weld cable to a welding torch 64.

Here again, it should be noted that the system of FIG. 4 is exemplary only, the present techniques allow for monitoring and analysis of performance of these types of cutting, heating, and welding systems, as well as others. Indeed, the same monitoring analysis system may collect data from different types, makes, sizes, and versions of metal fabrication systems. The data collected and analyzed may relate to different processes and weld procedures on the same or different systems. Moreover, as discussed above, data may be collected from support equipment used in, around or with the metal fabrication systems.

FIG. 5 illustrates certain functional components that may typically be found in the monitoring/analysis system. In the notation used in FIG. 5, these components will be located in a cloud-based service entity, although similar components may be included in any one of the implementations of the system. The components may include, for example, data collection components 68 that receive data from systems and entities. The data collection components may "pull" the data by prompting data exchange with the systems, or may work on a "push" basis where data is provided to the data collection components by the systems without prompting (e.g., at the initiation of the welding system, network device, or management system to which the equipment is connected). The data collection may occur at any desired frequency, or at points in time that are not cyclic. For example, data may be collected on an occasional basis as welding operations are performed, or data may be provided periodically, such as on a shift basis, a daily basis, a weekly basis, or simple as desired by a welding operator or facilities management team. The systems will also include memory 70 that store raw and/or processed data collected from the systems. Analysis/reporting components 72 allow for processing of the raw data, and associating the resulting analysis with systems, entities, groups, welding operators, and so forth. Examples of the analysis and reporting component operations are provided in greater detail below. Finally, communications components 74 allow for populating reports and interface pages with the results of the analysis. A wide range of such pages may be provided as indicated by reference numeral 76 in FIG. 5, some of which are described in detail below. The communications components 74 may thus include various servers, modems, Internet interfaces, web page definitions, and the like.

As noted above, the present techniques allow for a wide range of data to be collected from welding systems and support equipment for setup, configuration, storage, analysis, tracking, monitoring, comparison and so forth. In the presently contemplated embodiments this information is summarized in a series of interface pages that may be configured as web pages that can be provided to and viewed on a general purpose browser. In practice, however, any suitable interface may be used. The use of general purpose browsers and similar interfaces, however, allows for the data to be served to any range of device platforms and different types of devices, including stationary workstations, enterprise systems, but also mobile and handheld devices as mentioned above. FIGS. 6-13 illustrate exemplary interface pages that may be provided for a range of uses.

Referring first to FIG. 6, a goal report page 78 is illustrated. This page allows for the display of one or more welding system and support equipment designations as well as performance analysis based upon goals set for the systems. In the page illustrated in FIG. 6, a number of welding systems and support equipment are identified as indicated at reference numeral 80. These may be associated in groups as indicated by reference numeral 82. In practice, the data underlying all of the analyses discussed in the present disclosure are associated with individual systems. These may be freely associated with one another, then, by the interface tools. In the illustrated example, a location or department 84 has been created with several groups designated within the location. Each of these groups, then, may include one or more welding systems and any other equipment as shown in the figure. The present embodiment allows for free association of these systems so that useful analysis of individual systems, groups of systems, locations, and so forth may be performed. The systems and support equipment may be in a single physical proximity, but this need not be the case. Groups may be created for example, based on system type, work schedules, production and products, and so forth. In systems where operators provide personal identification information, this information may be tracked in addition to or instead of system information.

In the illustrated embodiment status indicators are illustrated for conveying the current operational status of the monitored systems and equipment. These indicators, as designated by reference numeral 86, may indicate, for example, active systems, idle systems, disconnected systems, errors, notifications, and so forth. Where system status can be monitored on a real-time or near real-time basis, such indicators may provide useful feedback to management personnel on the current status of the equipment. The particular information illustrated in FIG. 6 is obtained, in the present implementation, by selecting (e.g., clicking on) a goals tab 88. The information presented may be associated in useful time slots or durations, such as successive weeks of use as indicated by reference numeral 90. Any suitable time period may utilized, such as hourly, daily, weekly, monthly, shift-based designations, and so forth.

The page 78 also presents the results of analysis of each of a range of performance criteria based upon goals set for the system or systems selected. In the illustrated example a welding system has been selected as indicated by the check mark in the equipment tree on the left, and performance on the basis of several criteria is presented in bar chart form. In this example, a number of monitored criteria are indicated, such as arc on time, deposition, arc starts, spatter, and grinding time. A goal has been set for the particular system as discussed below, and the performance of the system as compared to this goal is indicated by the bars for each monitored parameter. It should be noted that certain of the parameters may be positive in convention while others may be negative. That is, by way of example, for arc on times, representing the portion of the working time in which a welding arc is established and maintained, a percentage of goal exceeding the set standard may be beneficial or desirable. For other parameters, such as spatter, exceeding a goal may actually be detrimental to work quality. As discussed below, the present implementation allows for designation of whether the analysis and presentation may consider these conventionally positive or conventionally negative. The resulting presentations 94 allow for readily visualizing the actual performance as compared to the pre-established goals.

Figure 7:
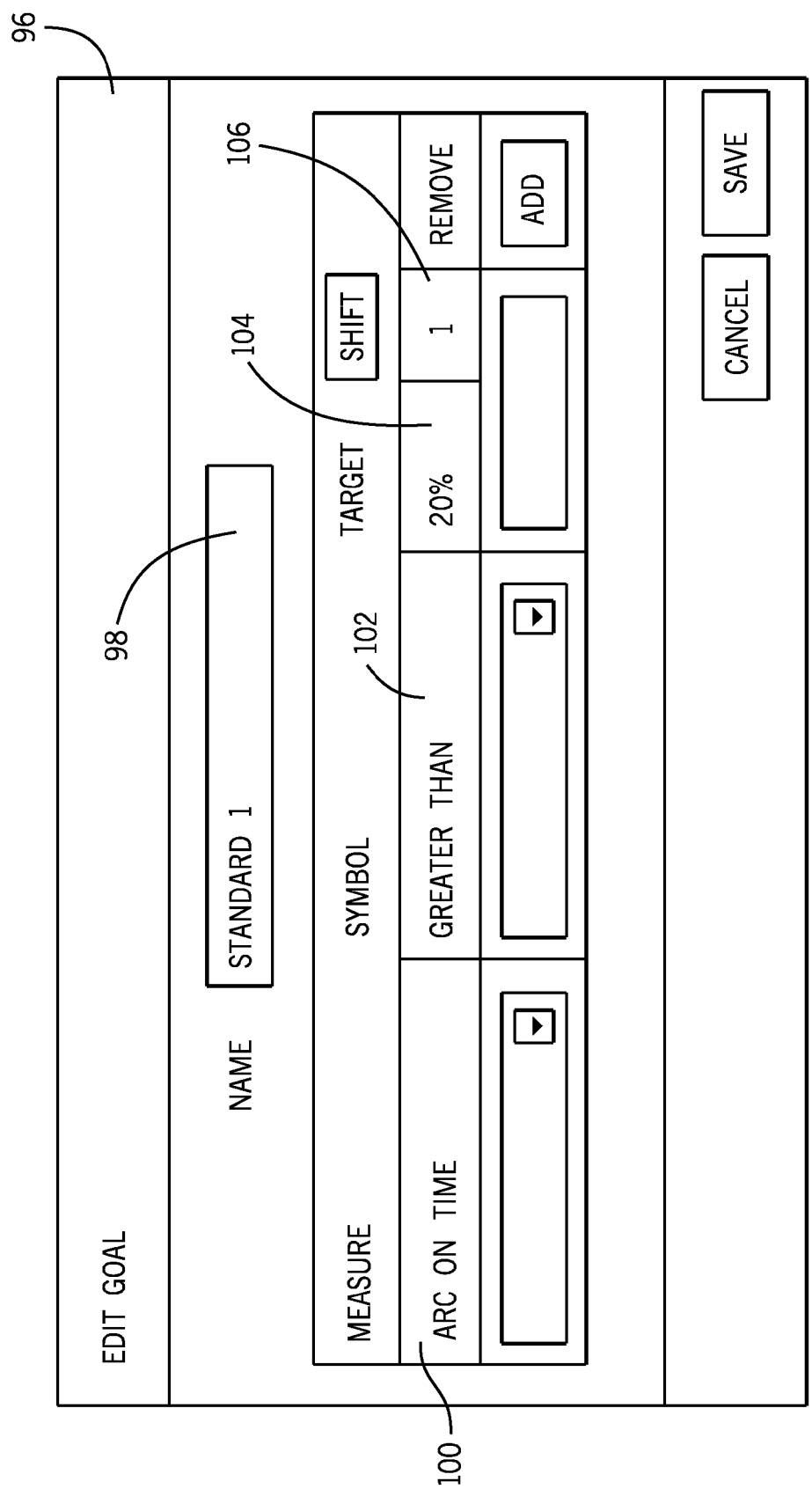
FIG. 7 is another exemplary web page view illustrating an interface for setting such goals.

FIG. 7 illustrates an exemplary goal editing page 96. Certain fields may be provided that allow for setting of standard or commonly used goals, or specific goals for specific purposes. For example, a name of the goal may be designated in a field 98. The other information pertaining to this name may be stored for use in analyzing the same or different systems. As indicated by reference numeral 100, the illustrated page allows for setting a standard for the goal, such as arc on time. Other standards and parameters may be specified so long as data may be collected that either directly or indirectly indicates the desired standard (i.e., allows for establishment of a value for comparison and presentation). A convention for the goal may be set as indicated at reference numeral 102. That is, as discussed above, certain goals it may be desired or beneficial that the established goal define a maximum value targeted, while other goals may establish a minimum value targeted. A target 104 may then be established, such as on a numerical percentage basis, an objective (e.g., unit) basis, relative basis, or any other useful basis. Further fields, such as a shift field 106 may be provided. Still further, in some implementations it may be useful to begin goal or standard setting with an exemplary weld known to have been done and possess characteristics that are acceptable. Goals may then be set with this as a standard, or with one or more parameters set based on this weld (e.g., +/−20%).

Figure 8:
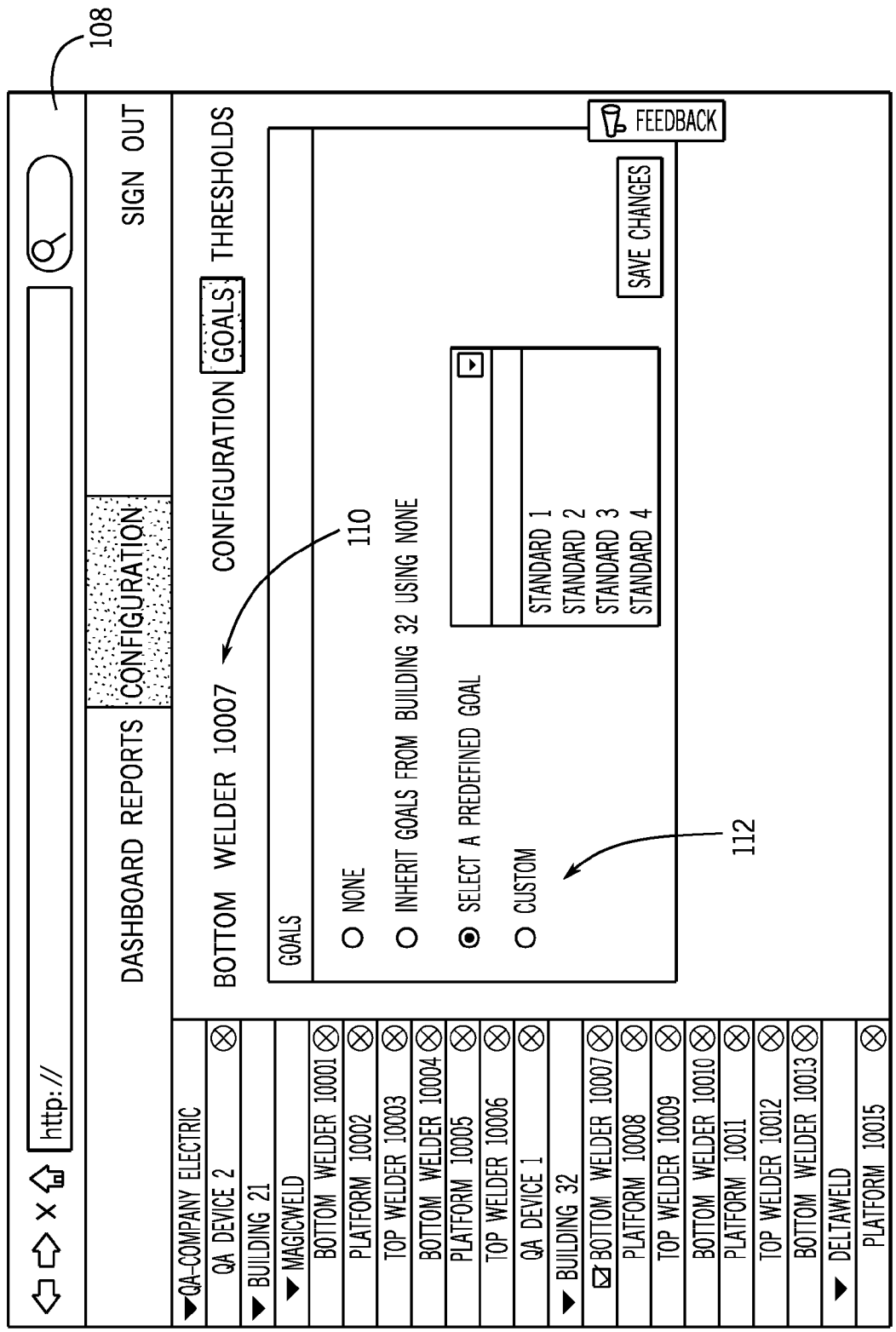
FIG. 8 is a further exemplary web page view of a goal setting interface.

FIG. 8 illustrates a goal setting page 108 that may take established goals set by pages such as that illustrated in FIG. 7 and apply them to specific equipment. In the page 108 of FIG. 8, a welding system designated "bottom welder" has been selected as indicated by the check mark to the left. The system identification 110 appears in the page. A menu of goals or standards is then displayed as indicated by reference numeral 112. In this example, selections include placing no goal on the equipment, inheriting certain goals set for a particular location (or other logical grouping), selecting a predefined goal (such as a goal established by a page such as thus shown in FIG. 7), and establishing a custom goal for the equipment.

Figure 9:
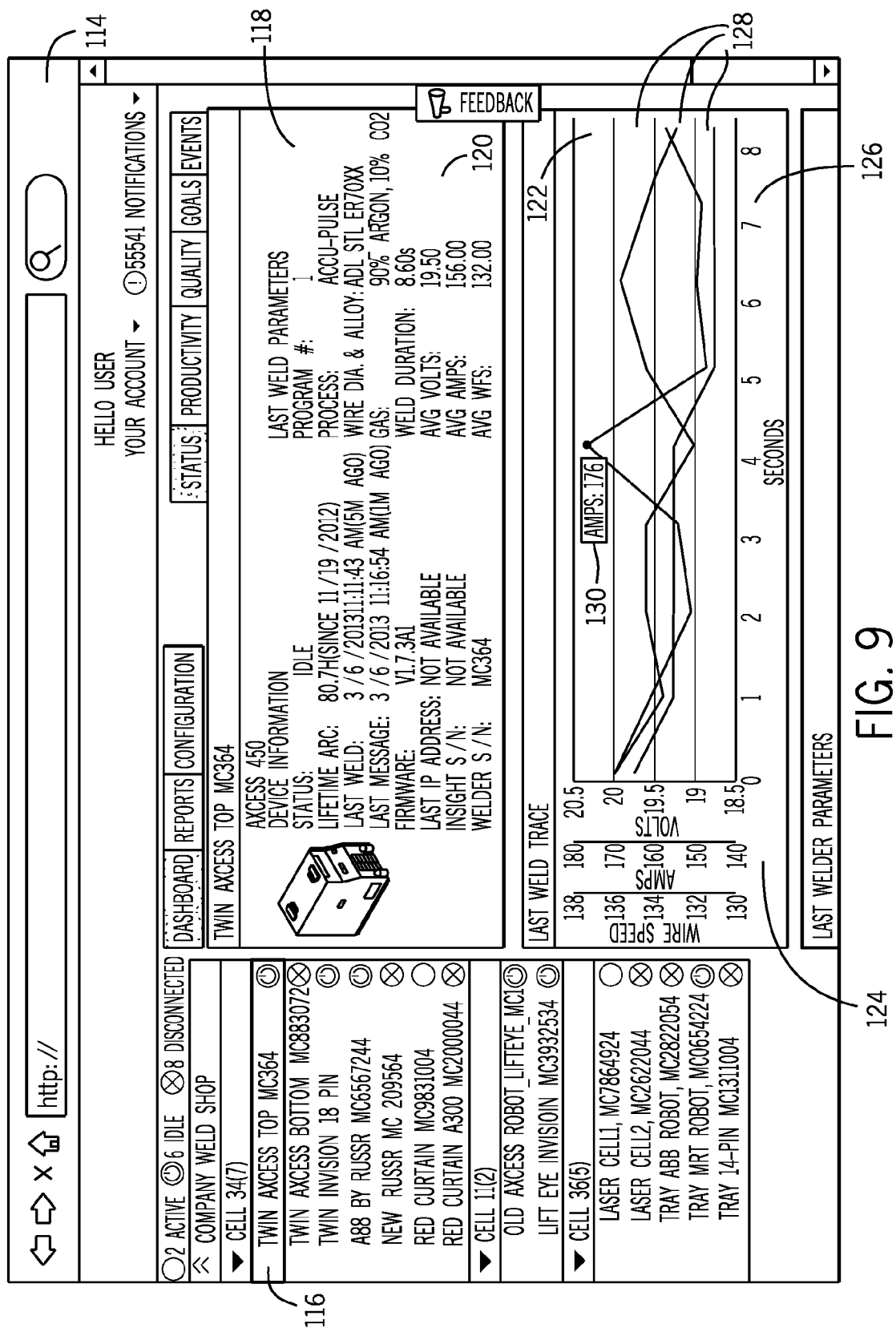
FIG. 9 is an exemplary web page view of an interface for tracing parameters of a particular weld or system.

The present techniques also allow for storing and analyzing certain performance parameters of systems in tracking or trace views. These views can be extremely informative in terms of specific welds, performance over certain periods of time, performance by particular operators, performance on particular jobs or parts, and so forth. An exemplary weld trace page 114 is illustrated in FIG. 9. As indicated on this page, a range of equipment may be selected as indicated on the left of the page, with one particular system being currently selected as indicated by reference numeral 116. Once selected, in this implementation a range of data relating to this particular system is displayed as indicated by reference numeral 118. This information may be drawn from the system or from archived data for the system, such as within an organization, within a cloud resource, and so forth. Certain statistical data may be aggregated and displayed as indicated at reference numeral 120.

The weld trace page also includes a graphical presentation of traces of certain monitor parameters that may be of particular interest. The weld trace section 122, in this example, shows several parameters 124 graphed as a function of time along a horizontal access 126. In this particular example, the parameters include wire feed speed, current, and volts. The weld for which the cases are illustrated in the example had duration of approximately 8 seconds. During this time the monitored parameters changed, and data reflective of these parameters was sampled and stored. The individual traces 128 for each parameter are then generated and presented to the user. Further, in this example by a "mouse over" or other input the system may display the particular value for one or more parameters at a specific point in time as indicated by reference numeral 130.

Figure 10:
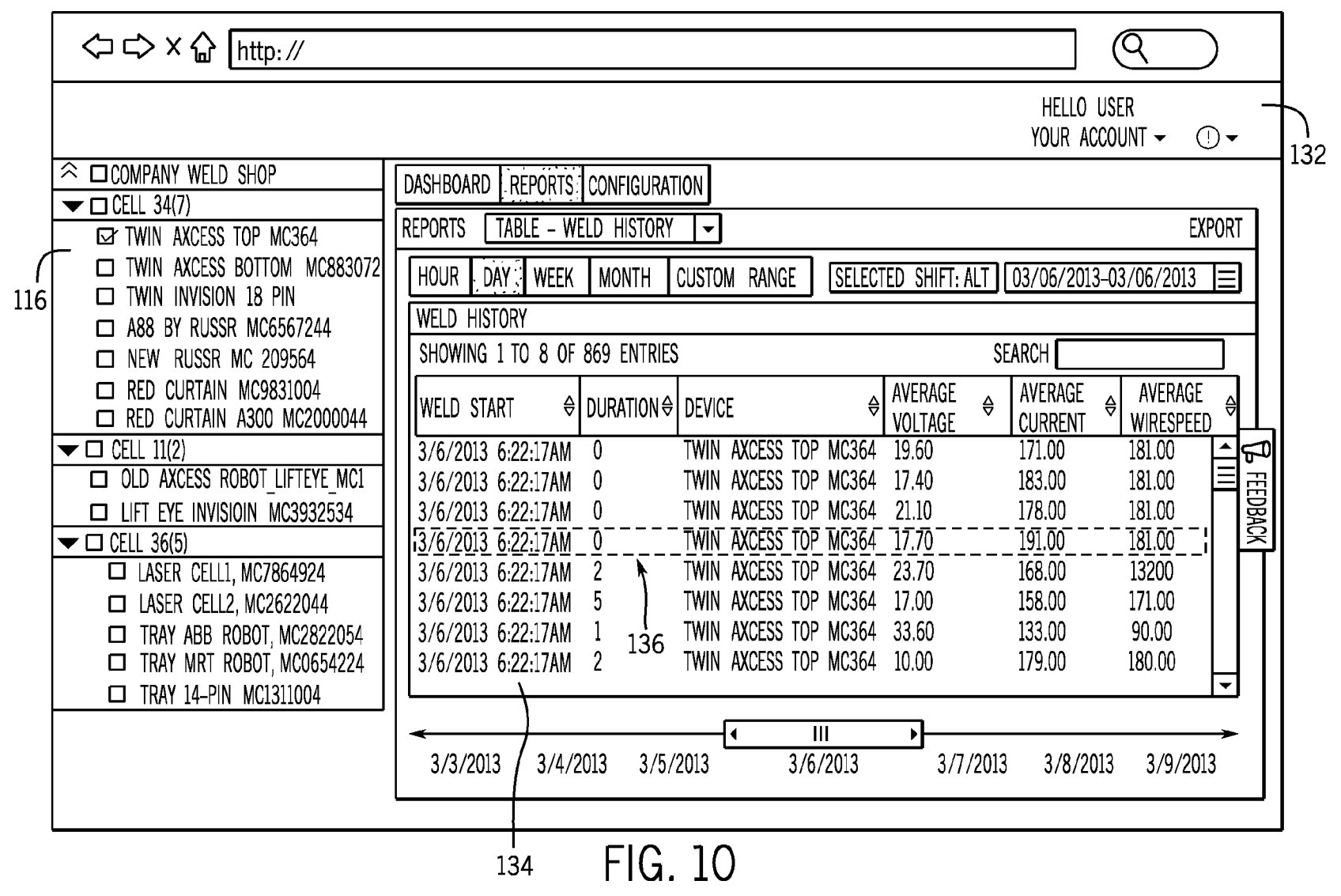

The trace pages may be populated, as may any of the pages discussed in the present disclosure, in advance or upon demand by a user. This being the case, the trace pages for any number of systems, and specific welds may be stored for later analysis and presentation. A history page 132 may thus be compiled, such as illustrated in FIG. 10. In the history page illustrated, a list of welds performed on a selected system 116 (or combination of selected systems) is presented as indicated by reference numeral 134. These welds may be identified by times, system, duration, weld parameters, and so forth. Moreover, such lists may be compiled for specific operators, specific products and articles of manufacture, and so forth. In the illustrated embodiment, a particular weld has been selected by the user as indicated at reference numeral 136.

Figure 11:
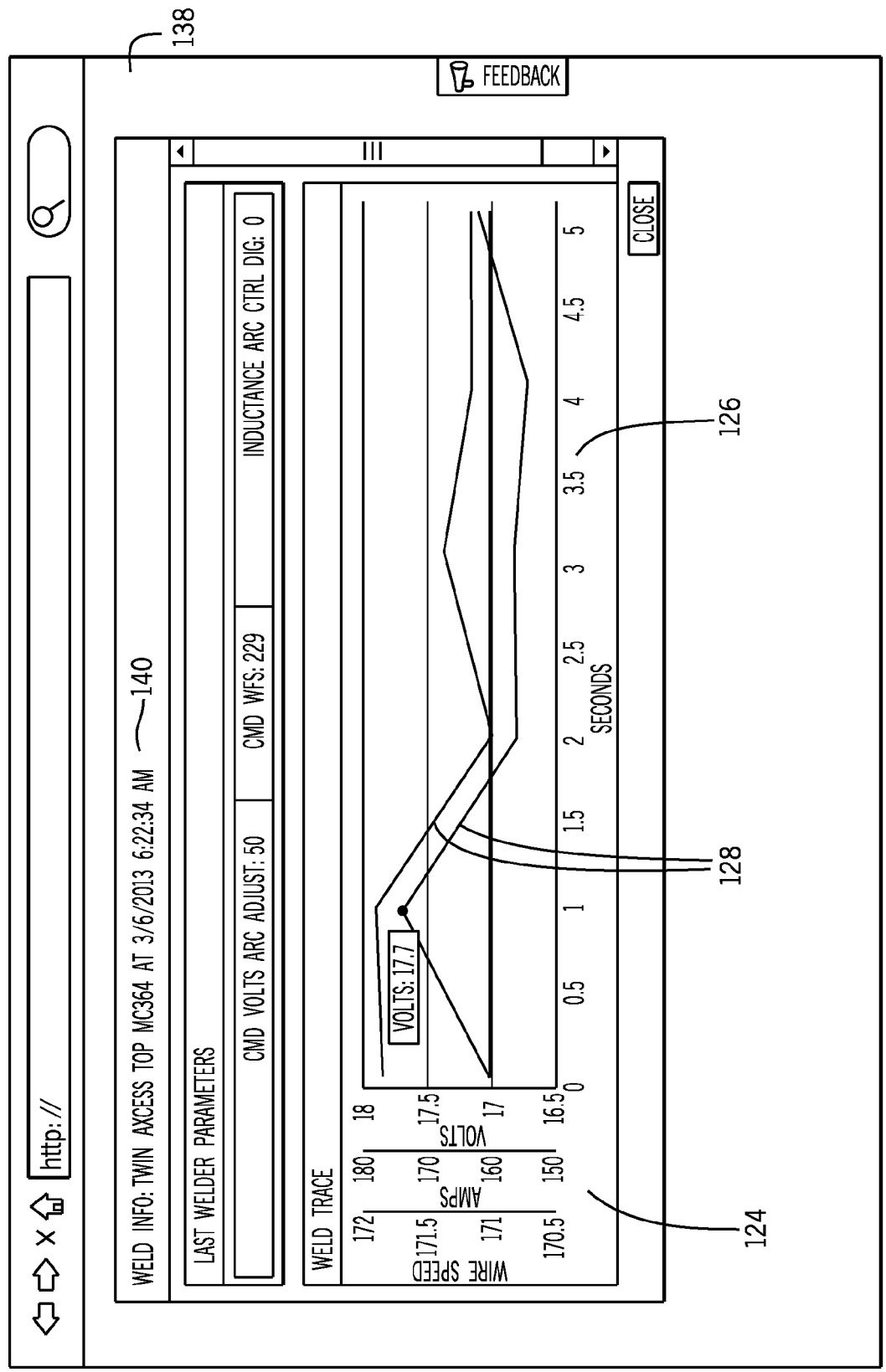
FIG. 11 is an exemplary web page view of historical traces available via the system.

FIG. 11 illustrates an historical trace page 138 that may be displayed following selection of the particular weld 136. In this view, an identification of the system, along with the time and date, are provided as indicated by reference numeral 140. Here again, monitored parameters are identified as indicated by reference numeral 124, and a time axis 126 is provided along which traces 128 are displayed. As will be appreciated by those skilled in the art, the ability to store and compile such analyses may be significantly useful in evaluating system performance, operator performance, performance on particular parts, performance of departments and facilities, and so forth.

Figure 12:
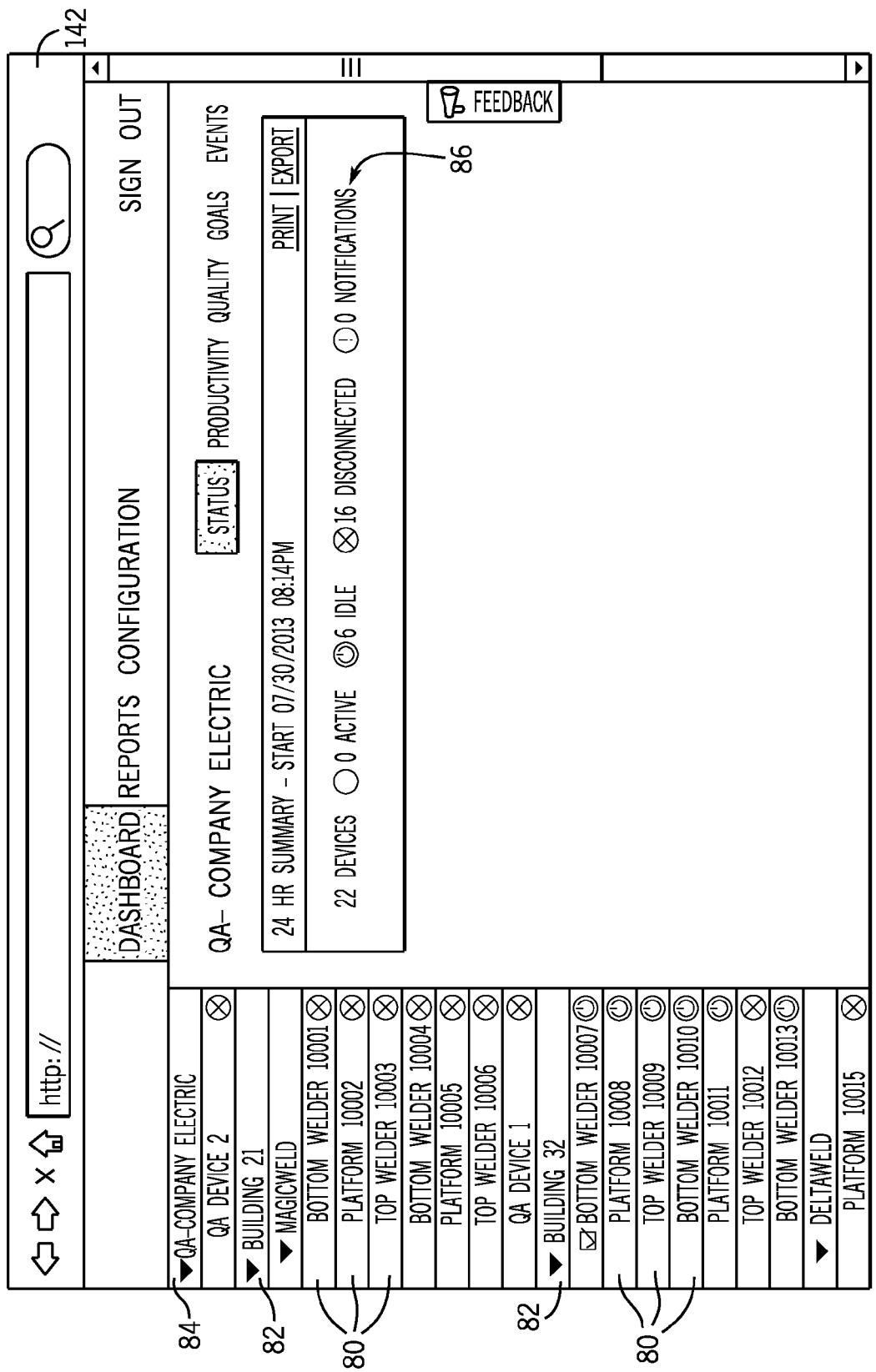
FIG. 12 is an exemplary web page view of a status interface allowing for selection of systems and groups of systems for comparison.
Figure 13:
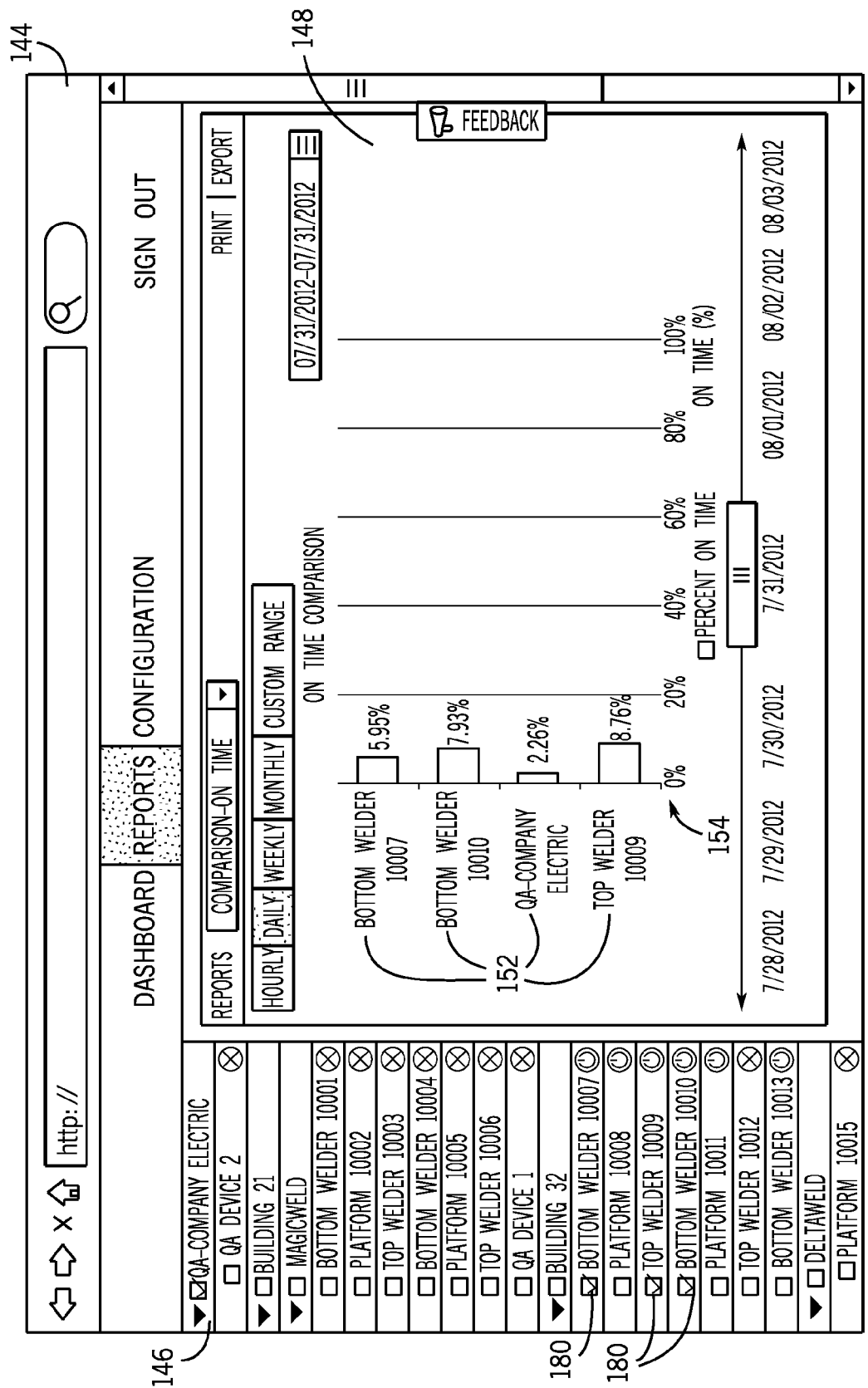
FIG. 13 is an exemplary web page view of a comparison of systems and groups of systems selected via the interface of FIG. 12.

Still further, the present techniques allow for comparisons between equipment on a wide range of bases. Indeed, systems may be compared, and presentations resulting from the comparison may be provided any suitable parameter that may form the basis for such comparisons. An exemplary comparison selection page 142 is illustrated in FIG. 12. As shown in this page, multiple systems 80 are again grouped into groups 82 for a facilities or locations 84. Status indicators 86 may be provided for the individual systems or groups. The status page illustrated in FIG. 12 may then serve as the basis for selecting systems for comparison as illustrated in FIG. 13. Here, the same systems and groups are available for selection and comparison. The comparison page 144 displays these systems and allows users to click or select individual systems, groups, or any sub-group that is created at will. That is, while an entire group of systems may be selected, the user may select individual systems or individual groups as indicated by reference numeral 146. A comparison section 148 is provided in which a time base for a comparison may be selected, such as on an hourly, daily, weekly, monthly, or any other range. Once selected, then, desired parameters are compared for the individual systems, with the systems being identified as indicated at reference numeral 152, and the comparisons being made and in this case graphically displayed as indicated by reference numeral 154. In the illustrated example, for example, system on time has been selected as a basis for the comparison. Data for each individual system reflective of the respective on time of the system has been analyzed and presented in a percentage basis by a horizontal bar. Other comparisons may be made directly between the systems, such as to indicate that one system has outperformed another on the basis of the selected parameter. More than one parameter could be selected in certain embodiments, and these may be based on raw, processed or calculated values.

The monitoring/analysis system 24 processes acquired data from one or more groups 18 of welding systems 12 and support equipment 16. As discussed above, the acquired data includes, but is not limited to, currents, voltages, systems activation time, arc starts, arc duration, wire feed rate, switch closures, and so forth. The monitoring/analysis system 24 presents this acquired data to the operator via the operator interface 26. The acquired data may be compared to goals stored in the memory 70. In addition to processing and presenting the acquired data and stored goals via the operator interface 26, presently contemplated embodiments of the monitoring/analysis system 24 analyze the acquired data and present analyzed system parameters, such as arc on time percentage (e.g., arc on %) and deposition (e.g., deposition quantity, deposition rate). The analyzed system parameters produced by the monitoring/analysis system 24 are calculated values that facilitate comparisons between welding systems 12 or groups 82 of welding systems 12, comparisons between operators and shifts, and/or comparisons between departments/locations 20. In some embodiments, the monitoring/analysis system 24 may automatically present one or more analyzed system parameters on a page 76 (e.g., start-up screen or "dashboard") without user instructions to do so, thereby enabling an operator to evaluate performance upon viewing the page 76 without additional inputs to the operator interface 26. Automatic determination of the analyzed system parameters eliminates a step by the user to perform calculations separately, such as with a calculator, mentally, or by hand. Accordingly, the user may evaluate the performance more quickly than if the analyzed system parameters were not automatically determined and presented.

The analyzed system parameters may include arc on time percentage (e.g., arc on %) and deposition. The arc on % for one or more welding systems 12 during a time period (e.g., day, shift, week, month) may be determined from Equation (1):

$$\text{Arc On\%} = T_{arc\ on}/T_{work} \qquad \text{Equation (1)}$$

where $T_{work}$ is the cumulative working time that the one or more welding systems 12 are powered on (e.g., ready to supply an arc to a torch) during the time period, and $T_{arc\ on}$ is the cumulative time that the one or more welding systems 12 have an active arc during the time period. The arc on % value may be useful as a metric to evaluate and compare welding experience of a first group of one or more welding operators to a second group of one or more welding operators. For example, the arc on % for an experienced welder performing a first weld with a first welding system 12 may be greater than the arc on % for a less experienced welder for the first weld with the first welding system 12. In some embodiments, the arc on % value may be used to evaluate and compare the welding proficiency of one or more welding operators using one or more welding systems 12 during a first time period to the same one or more operators using the same one or more welding systems 12 during a second time period. The arc on % value may also be useful as a metric to evaluate and compare the efficiency and/or productivity of the first group to a second group, or the first group to itself between a first time period and a second time period. For example, a drop in arc on % from a first time period to the second time period may indicate the occurrence of an event (e.g., increased complexity, welder distraction, welding error) during the time period for a system administrator or manager to investigate. The monitoring/analysis system 24 may present on a user viewable page 76 comparisons of arc on % value between the first group and the second group and/or comparisons of arc on % value between a first group during a first time period and the first group during a second time period. In some embodiments, the arc on % value may be useful as a metric to evaluate multiple welding systems 12 by comparing the arc on % between a first group of welding systems 12 and a second group of welding systems 12 where both are utilized by the same operators.

The deposition for a welding system 12 during a time period may be determined from Equation (2):

$$\text{Deposition(quantity)} = \text{WFS} * d * T_{arc\ on} \qquad \text{Equation (2)}$$

where WFS is the wire feed speed (e.g., inches per minute), d is the wire density (e.g., pounds per inch), and $T_{arc\ on}$ is the cumulative time (e.g., minutes) that the welding system 12 has an active arc during the time period. The WFS, wire density, and/or wire diameter may be entered by a user. In some embodiments, the welding system 12 determines the WFS based on weld parameters (e.g., current, voltage, materials). Additionally or in the alternative, some embodiments of the welding system 12 may determine the wire diameter. The WFS and d may vary based at least in part on the characteristics (e.g., materials, width, wire diameter) of the weld. The monitoring/analysis system 24 may determine the deposition value as the total amount (e.g., weight) of wire deposited during a time period or a rate of deposition per minute or per hour during $T_{work}$. The deposition rate may be determined by dividing the deposition quantity from Equation (2) by the cumulative working time that the welding system 12 is powered on ($T_{work}$).

Figure 14:
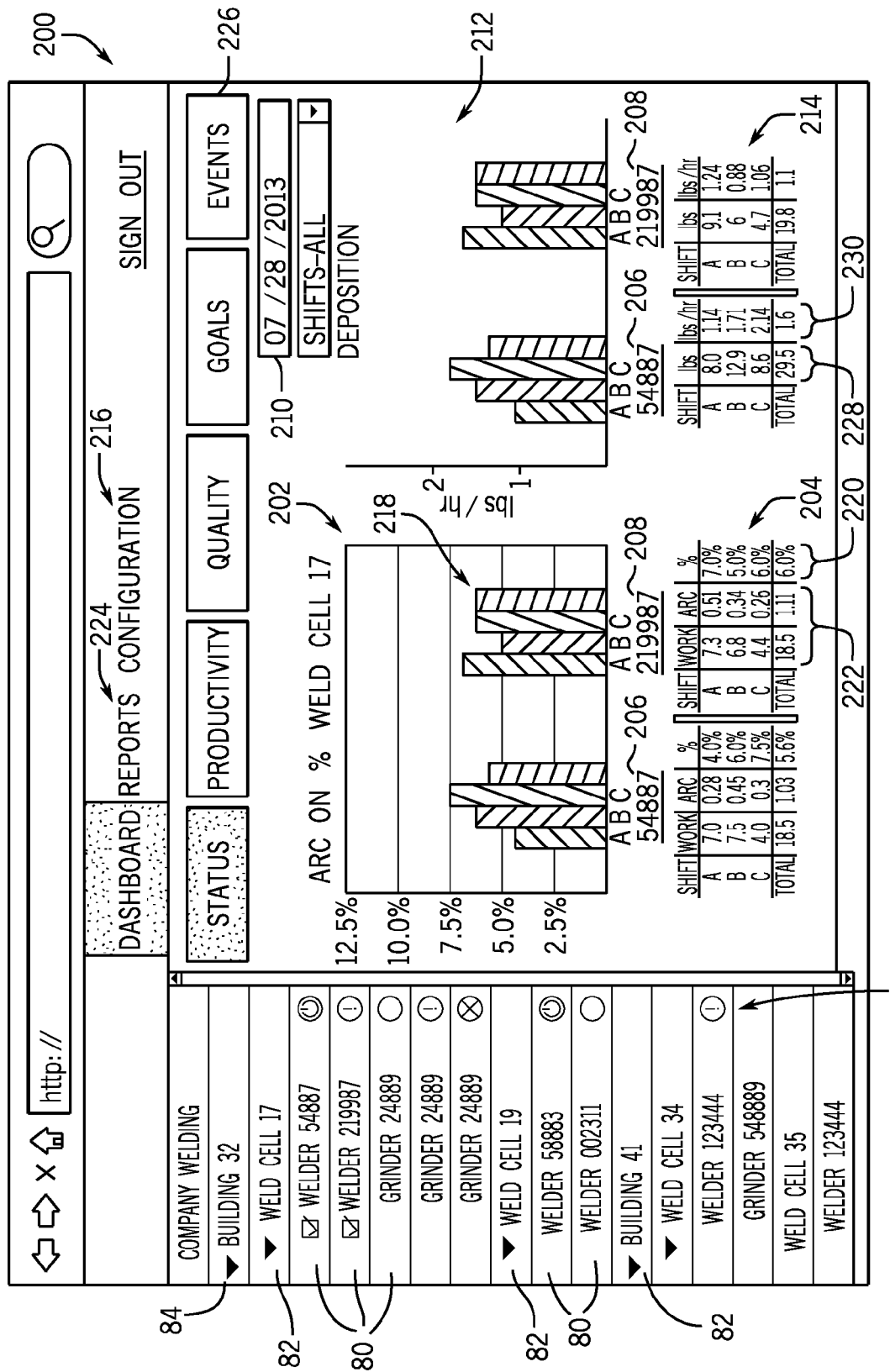
FIG. 14 is an exemplary web page view of a dashboard page of analyzed system parameters determined by the system.

FIG. 14 illustrates an embodiment of a dashboard page 200 presenting the arc on % and deposition as analyzed system parameters. The dashboard page 200 may be a page 76 presented to the user upon initiating a session with the monitoring/analysis system 24 via the operator interface 26. In some embodiments, an operator may configure the dashboard page 200 to present the analyzed system parameters for one or more welding systems 80 utilized by one or more operators (e.g., shifts). For example, the dashboard page 200 of FIG. 14 presents the analyzed system parameters of arc on time percentage and deposition for two selected welding systems 80 utilized over several shifts in a time period 210. The operator may configure the dashboard page 200 to present analyzed system parameters in various graphs, tables, lists, and so forth arranged at various customizable locations about the dashboard page 200. The analyzed system parameters may be presented for comparison and evaluation of one or more welding systems 80 over one or more time periods 210. More complete descriptions of such arrangements of analyzed system parameters about the dashboard page 200 is provided, for example, in U.S. application no. 2009/0313549, entitled Configurable Welding Interface for Automated Welding Applications, filed by Casner et al. on Jun. 16, 2008.

An arc on percentage graph 202 and/or an arc on percentage table 204 present the arc on % for a first welding system 206 and a second welding system 208 for multiple shifts during the time period 210, which may be a particular day, week, month, etc. A deposition graph 212 and/or a deposition table 214 present the deposition for the first welding system 206 and the second welding system 208 for multiple shifts during the time period 210. In some embodiments, the dashboard page 200 may present various combinations of the arc on percentage graph 202, the arc on percentage table 204, the deposition graph 212, the deposition table 214, and other representations of analyzed system parameters. The operator may configure the arrangement and composition of the dashboard page 200 via the configuration tab 216.

The arc on percentage graph 202 presents graphical representations 218 for the arc on % for each selected shift (e.g., shift A, shift B, shift C) utilizing the first welding system 206 and the second welding system 208 during the time period 210 or time range. The arc on percentage graph 202 may also present a value for the total arc on % for the time period 210 over the selected shifts. The arc on percentage graph 202 enables a viewer of the dashboard page 200 to readily compare the arc on % values for each respective shift and respective machine to identify issues for further review. The arc on percentage table 204 presents numerical values 220 for the arc on time percentage for each selected shift utilizing at least the first and second welding systems 206, 208 during the time period 210. In some embodiments, the arc on percentage table 204 presents acquired data 222 utilized to generate the analyzed system parameter 220. The arc on time percentage 220 and acquired data 222 presented together may provide the user viewing the dashboard page 200 a more complete review of a status of the first and second welding systems 206, 208 during the time period 210 than either the arc on time percentage 220 or the acquired data 222 alone. For example, the dashboard page 200 illustrates an embodiment in which the arc on % value for shift A utilizing the first welding system 206 is less than the arc on % value for shifts B and C. Upon noticing the difference, the viewer may investigate a cause by reviewing the acquired data 222, one or more reports (e.g., via a reports tab 224), and/or a list of events (e.g., via events page 226).

The deposition graph 212 may present a quantity of a welding wire deposited and/or a deposition rate for the selected first and second welding machines 206, 208 during the time period 210. The deposition graph 212 of the deposition rate for the first and second welding systems 206, 208 may have similar shapes. For example, the deposition graph 212 may have approximately the same shape as the arc on % graph 202 where the wire diameter and the density per unit length of the wire for each welding machine scale the deposition graph 212 relative to the arc on % graph 202. As shown in the deposition table 214, the first welding system 206 may deposit a greater quantity (e.g., approximately 50%) of welding wire during the time period 210 than the second welding system 208 despite that the first and the second welding systems 206, 208 have substantially the same arc on % values over the time period 210. The scale difference in the deposition graph 212 may be based at least in part on a difference in the wire diameter and density per unit length of the welding wire (e.g., welding wire diameter of first welding system 206 is greater than welding wire diameter of second welding system 208) and/or a difference in the WFS between the welding systems (e.g., WFS of the first welding system 206 is greater than the WFS of the second welding system 208). The deposition table 214 presents the deposition quantity 228 (e.g., lb) and deposition rate 230 (e.g., lbs/hr) for each shift of the first and the second welding system 206, 208 during the time period 210. The deposition table 214 may present the total deposition quantity 228 for the time period 210 from the shifts, and/or may present the average deposition rate for each welding system over the time period 210.

Figure 15:
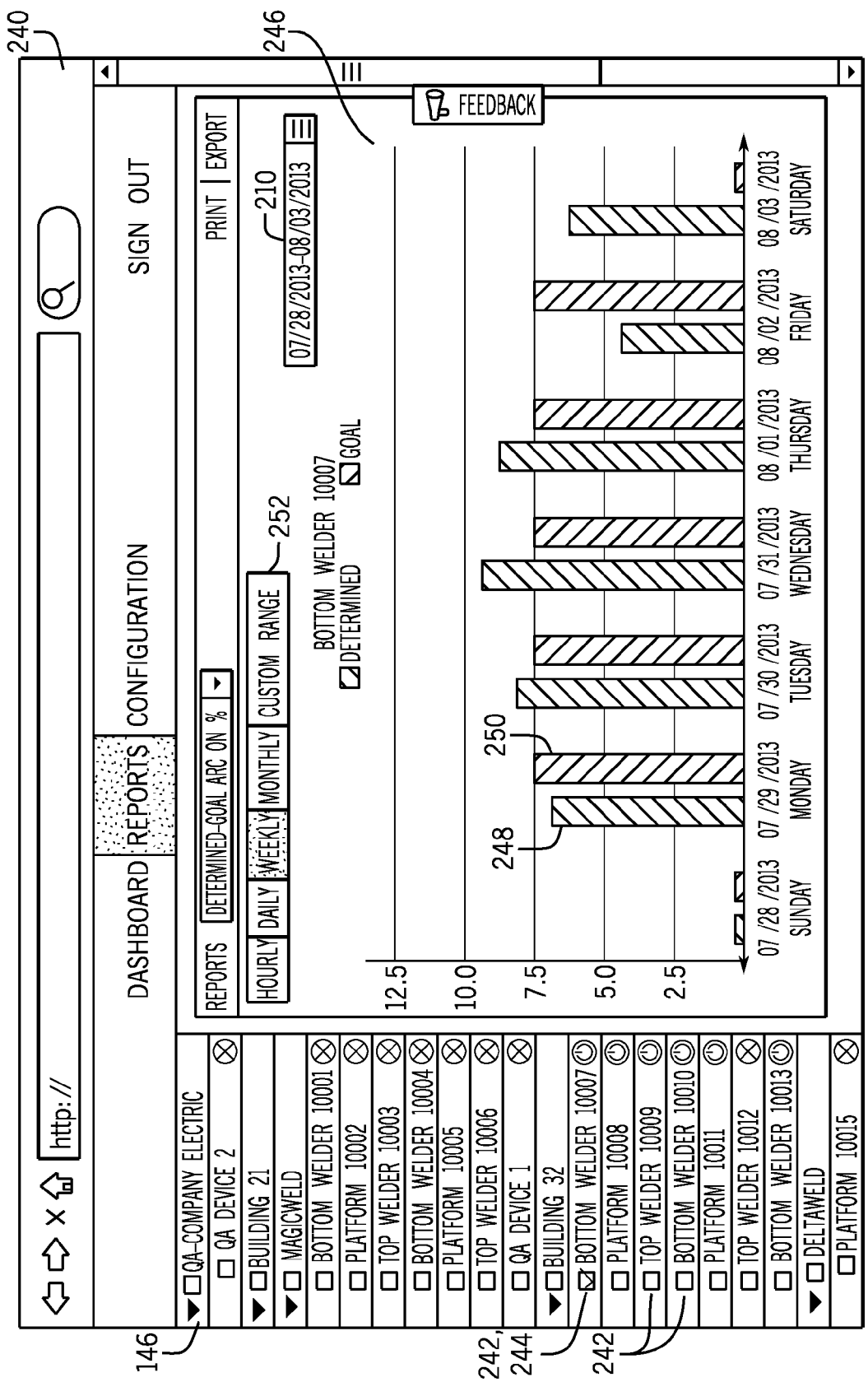
FIG. 15 is an exemplary web page view of a report page of a comparison of determined analyzed system parameters to goal analyzed system parameters.

FIG. 15 illustrates a reports page 240 that may facilitate comparing goals of analyzed system parameters stored in memory for one or more selected systems to determined analyzed system parameters of the one or more selected systems over one or more time periods. The various individual systems or groups 146 of welding systems 242 are available for selection and comparison. The reports page 240 displays these systems and allows users to click or select individual systems, groups, or any sub-group that is created at will. That is, while an entire group 146 of systems may be selected, the user may select individual systems or individual groups as indicated by reference numeral 244. A reports section 246 is provided in which a range of time periods 210 for a comparison may be selected, such as on an hourly, daily, weekly, or monthly basis, or any other range. Once the systems 242 and a time period 210 are selected, then, determined analyzed system parameters (e.g., arc on %, deposition) are compared to stored goals for the analyzed system parameters for the selected individual systems or individual groups 244.

In the illustrated example, arc on % has been selected as a basis for the comparison. The determined arc on % data for the selected system 244 is presented for each time period in a percentage basis by a vertical bar 248 adjacent to the goal arc on % value presented by a vertical bar 250. As may be appreciated, the goal arc on % value may be different for each time period. In some embodiments, the goal arc on % value is presented as a line across the reports section 246, and the line may illustrate a goal arc on % value for multiple time periods. In the reports page 240 shown in FIG. 15, the determined arc on % values meet or exceed the goal arc on % values for the dates Jul. 30-Aug. 1, 2013 and Aug. 3, 2013 (e.g., Tuesday, Wednesday, Thursday, and Saturday), and the determined arc on % values fall short of the goal arc on % values for the dates Jul. 29, 2013 and Aug. 2, 2013 (e.g., Monday and Friday). FIG. 15 illustrates an example for which the selected systems 244 were utilized approximately in accordance with the stored goals for the dates Jul. 29, 2013 to Aug. 1, 2013, the determined arc on % for the date Aug. 2, 2013 fell short of the goal arc on %, and the selected system 244 was utilized on the date Aug. 3, 2013 for which no goal arc on % was stored in memory or the goal arc on % was 0%. From the report page 240, the user may observe that arc on % for the selected system 244 peaked in the middle (e.g., Jul. 31, 2013) of the week, arc on % on Aug. 2, 2013 (e.g., Friday) sharply decreased, or the selected system 244 was utilized on Aug. 3, 2013 (e.g., Saturday), or any combination thereof. These observations may enable a user to adjust arc on % goals for the selected system 244 in view of productivity trends and/or to work with the operators of the selected welding system 244 to improve arc on % on Fridays and/or any given time for which productivity is decreased relative to other time periods. In some embodiments, the monitoring/analysis system 24 may analyze historic trends of analyzed system parameters relative to goals and generate projected trends for the analyzed system parameters for future time periods. The projected trends may be stored as goals for the future time periods. In some embodiments, the projected trends may be based at least in part on expected productivity improvements that affect the analyzed system parameters. For example, projected trends may account for greater productivity improvements after supplemental training. As another example, projected trends may be used to set arc on % goals for a shift that increase to a desired threshold, where the threshold is based at least in part on shift experience and/or shift training time.

In some embodiments, the user may compare the determined arc on % for one or more welding systems 242 to stored goals over various time ranges 252. The time ranges may include, but are not limited to hourly, daily, weekly, monthly, or any custom range. Through comparison of the determined analyzed system parameters to stored goals over various time ranges 252, the user may identify trends that may be useful for setting analyzed system parameter goals. After identifying trends (e.g., relative increase in arc on % to peak during middle of week and/or middle of shift, relative decrease in arc on % on Friday and/or end of shift), the user may adjust individual goals for one or more time periods to encourage increased performance for each time period. For example, the arc on % goal for Wednesdays or the middle of a shift may be set higher than the arc on % goal for Fridays or the end of a shift.

Figure 16:
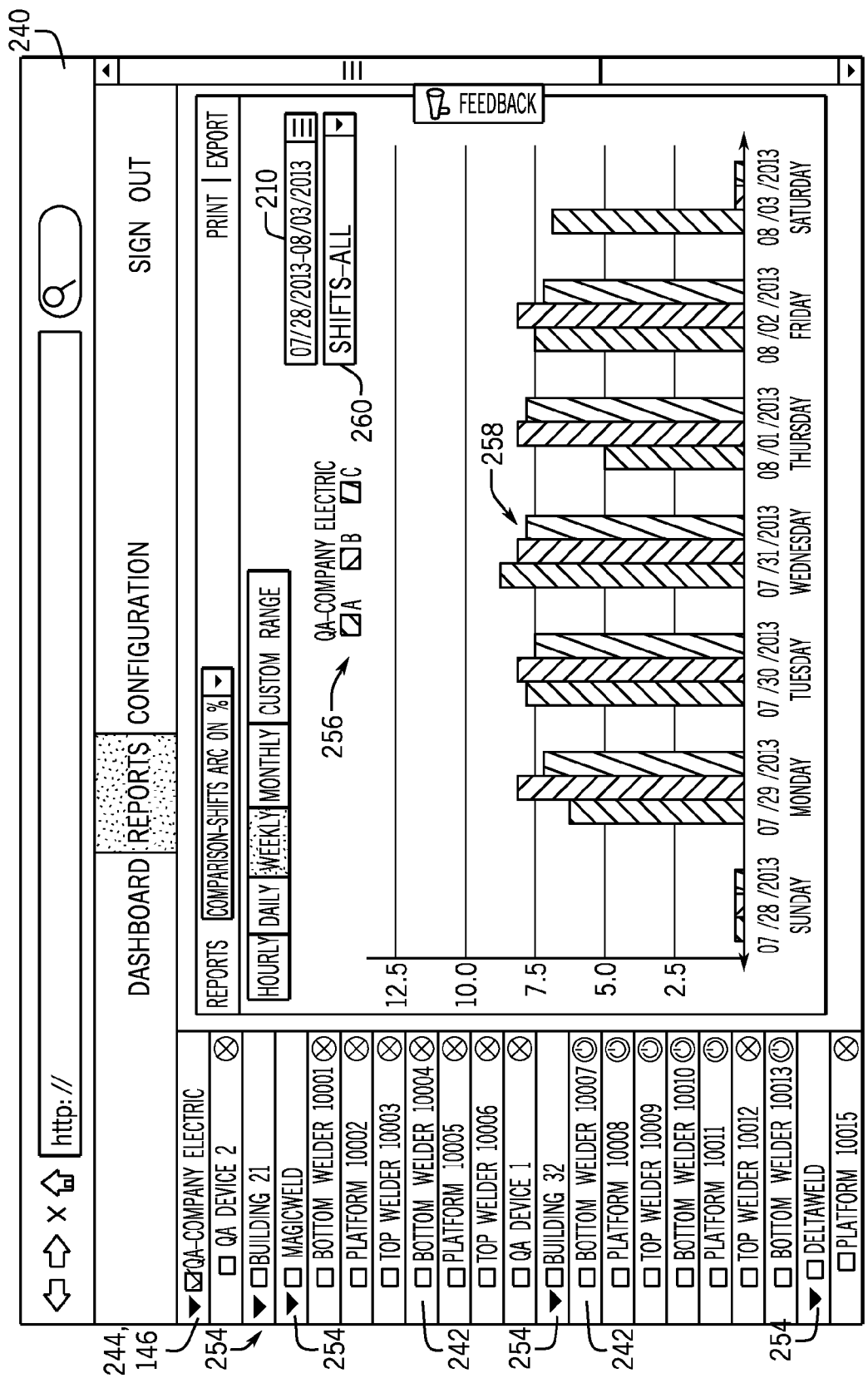
FIG. 16 is an exemplary web page view of a report page of a comparison between shifts of determined analyzed system parameters over a time period.

The user may compare determined analyzed system parameters for one or more groups of operators (e.g., shifts) utilizing selected systems or groups 244 of welding systems 242 over a time period 210. FIG. 16 illustrates an embodiment of a report page 240 that compares the arc on % for the selected group 244, and the selected group 244 includes multiple subgroups 254 of welding systems 242 that may be utilized during multiple shifts 256 (e.g., shift A, shift B, shift C). As may be appreciated, some welding systems 242 may be utilized by multiple shifts and/or by multiple operators. The report page 240 presents the arc on % analyzed system parameter for each of the shifts 256 as bars 258 over the selected time period 210 for comparison to one another. Additionally, or in the alternative, a report page 240 may present the deposition quantity, deposition rate, or other analyzed system parameter for multiple shifts or operators over the selected time period 210. The user may select a customized set of the groups 244 and the subgroups 254 of welding systems 242 for comparison of respective analyzed system parameters over the time period 210. In some embodiments, the user may select operators and/or shifts for comparison via a shift control 260. In some embodiments, the report page 240 may present acquired data from the time period 210 in addition to analyzed system parameters. Accordingly, the reports page may present analyzed system parameters for multiple types of comparisons.

In conclusion, the monitoring analysis circuitry may process the acquired data to determine the analyzed system parameters (e.g., arc on %, deposition, etc.) that are presented to a user. These analyzed system parameters may be presented on an initial page (e.g., dashboard) viewed by the user, thereby facilitating easy and rapid review of the relative status of one or more welding systems. The analyzed system parameters may be used for comparisons between welding systems, between welding operators, between a first group of welding systems to a second group of welding systems, between a first group of welding operators and a second group of welding operators, and so forth. The comparisons (e.g., graphical representations) may provide the user with more information than the acquired data alone. In some embodiments, the monitoring/analysis circuitry may facilitate visual comparisons of analyzed system parameters (e.g., arc on %, deposition) for a first group of one or more welding systems to itself as utilized by the same or different groups (e.g., shifts). The comparisons may be over a predefined time range (e.g., hourly, daily, weekly, monthly) or over a user defined time range. For example, the monitoring/analysis circuitry may present a comparison of the arc on % for a first welding system used by shift A over a week to the arc on % for the first welding system used by shift B over the same week or a different week. In some embodiments, the monitoring/analysis circuitry may facilitate visual comparisons of analyzed system parameters (e.g., arc on %, deposition, etc.) for the first group of one or more welding systems to a second group of welding systems utilized by the same or different groups (e.g., shifts). The comparisons may be over a predefined time range or over a user defined time range. For example, the monitoring/analysis circuitry may present a comparison of the deposition for a first welding system used by shift A on a date to the deposition for a second welding system used by shift A or shift B on the same or different date. As discussed above, the analyzed system parameters are determined by the monitoring/analysis circuitry at least in part from acquired data, while the analyzed system parameters are not directly acquired from the one or more welding systems.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A metal fabrication resource performance monitoring method comprising:
   acquiring data representative of a plurality of parameters sampled during metal fabrication operations of a plurality of metal fabrication resources;
   via at least one computer processor, analyzing at least one of the plurality of the acquired parameters for the plurality of metal fabrication resources;
   via the at least one computer processor, populating a user viewable dashboard page with graphical indicia representative of at least one of the plurality of the acquired parameters, comparing a first subset of the acquired data to a second subset of the acquired data; and
   transmitting the user viewable dashboard page to a user viewable display.

2. The method of claim 1, wherein analyzing at least one of the plurality of the acquired parameters for the plurality of metal fabrication resources the comprises determining an arc on time percentage, a deposition quantity, or a deposition rate, or any combination thereof.

3. The method of claim 1, wherein analyzing at least one of the plurality of the acquired parameters for the plurality of metal fabrication resources comprises:
   determining a first performance parameter from the plurality of the acquired parameters;
   comparing the first performance parameter to a stored goal for the performance parameter; and
   populating the user viewable dashboard page with graphical indicia representative of the first performance parameter relative to the stored goal for the performance parameter.

4. The method of claim 1, comprising:
   analyzing a second acquired parameter of the plurality of the acquired parameters; and
   populating the user viewable dashboard page with graphical indicia representative of the second acquired parameter of the plurality of the acquired parameters.

5. The method of claim 4, wherein the first subset of the acquired data corresponds to a first metal fabrication resource, and the second subset of the acquired data corresponds to a different second metal fabrication resource.

6. The method of claim 4, wherein the first subset of the acquired data corresponds to a first metal fabrication resource over a first time period, and the second subset of the acquired data corresponds to the first metal fabrication resource over a different second time period.

7. A metal fabrication resource performance monitoring method comprising:
   acquiring data representative of a plurality of parameters sampled during metal fabrication operations of a plurality of operators using a plurality of metal fabrication resources;
   via at least one computer processor, analyzing at least one of the plurality of acquired parameters for the plurality of metal fabrication resources;
   via the at least one computer processor, populating a user viewable dashboard page with graphical indicia representative of at least one of the plurality of the acquired parameters comparing a first group of operators of the plurality of operators to a second group of operators of the plurality of operators; and
   transmitting the user viewable dashboard page to a user viewable display.

8. The method of claim 7, wherein the acquired parameters comprise work time and arc on time of the plurality of metal fabrication resources, wherein the graphical indicia are representative of arc on time percentage, and wherein the arc on time percentage is determined by a ratio of the arc on time to the work time.

9. The method of claim 8, comprising comparing the arc on time percentage to a stored goal for arc on time percentage.

10. A metal fabrication resource performance monitoring method comprising:
    acquiring data representative of a plurality of parameters sampled during metal fabrication operations of a plurality of operators using a plurality of metal fabrication resources over at least two shifts;
    via at least one computer processor analyzing at least one of the plurality of acquired parameters;
    via the at least one computer processor, populating a user viewable dashboard page with graphical indicia representative of the at least one of the plurality of acquired parameters comparing between the at least two shifts; and
    transmitting the user viewable dashboard page to a user viewable display.

11. The method of claim 10, comprising:
    determining a deposition, wherein the acquired data is representative of arc on time, a wire feed speed, and density of a wire, and wherein the deposition is based at least in part on the arc on time, the wire feed speed, and the density of the wire; and
    populating the user viewable dashboard page with graphical indicia representative of deposition comparing between the at least two shifts.

12. The method of claim 11, wherein the deposition comprises a deposition rate.

13. The method of claim 11, comprising comparing the deposition to a stored goal for deposition.

14. A metal fabrication resource performance monitoring interface comprising:
    at least one user viewable dashboard page defined by computer executed code transmitted to a user viewing device, the dashboard page comprising:
       user viewable indicia identifying a plurality of metal fabrication resources from which data was acquired; and
       graphical indicia representative of a parameter acquired from at least one of the plurality of metal fabrication resources comparing a first subset of the acquired data to a second subset of the acquired data.

15. The interface of claim 14, wherein the code is executable by a processor for viewing in a general purpose browser.

16. The interface of claim 14, wherein the acquired parameter comprises arc on time percentage, deposition quantity, or deposition rate of the plurality of metal fabrication resources, or any combination thereof.

17. The interface of claim 14, comprising at least one user viewable page configured to permit a user to select at least a time period for reporting and the parameter for comparison.

18. The method of claim 1, wherein the user viewable dashboard page comprises a plurality of user-selectable buttons comprising:
    a status button that causes a status of the plurality of metal fabrication resources to be displayed on the user viewable dashboard page when selected;
    a productivity button that causes one or more productivity parameters determined from the first subset of the acquired data and the second subset of the acquired data to be displayed on the user viewable dashboard page when selected; and a goals button that causes at least one of the acquired parameters to be displayed relative to a stored goal for the acquired parameter on the user viewable dashboard page when selected.

19. The method of claim 4, wherein the first subset of the acquired data corresponds to a first group of metal fabrication resources, and wherein the second subset of the acquired data corresponds to a second group of metal fabrication resources.

20. The method of claim 19, wherein the first group of metal fabrication resources corresponds to a first shift, a first department, a first facility, or a first location, and wherein the second group of metal fabrication resources corresponds to a second shift, a second department, a second facility, or a second location.

21. The method of claim 20, wherein the graphical indicia of the user viewable dashboard page compare the first shift to the second shift, the first department to the second department, the first facility to the second facility, or the first location to the second location, with regard to welding proficiency, efficiency, or productivity, or any combination thereof.

22. The method of claim 7, wherein the graphical indicia comprises a line graph, or a bar chart, or any combination thereof.

23. The method of claim 7, wherein the first group of operators corresponds to a first shift and the second group of operators corresponds to a second shift.

24. The method of claim 7, wherein the first group of operators corresponds to a first facility and the second group of operators corresponds to a second facility.

25. The method of claim 7, wherein analyzing at least one of the plurality of the acquired parameters for the plurality of metal fabrication resources comprises determining an arc on time percentage, a deposition quantity, or a deposition rate, or any combination thereof.

26. The method of claim 7, wherein analyzing at least one of the plurality of the acquired parameters for the plurality of metal fabrication resources comprises:

determining a first performance parameter from the plurality of the acquired parameters;

comparing the first performance parameter to a stored goal for the performance parameter; and populating the user viewable dashboard page with graphical indicia representative of the first performance parameter relative to the stored goal for the performance parameter.

27. The method of claim 10, wherein the plurality of acquired parameters comprise work time and arc on time, and wherein analyzing at least one of the plurality of acquired parameters comprises determining an arc on time percentage from the plurality of the acquired data, wherein the arc on time percentage is determined by a ratio of the arc on time to the work time, and comparing the arc on time percentage to a stored goal for the arc on time percentage.

28. The method of claim 10, wherein the user viewable dashboard page comprises:

a plurality of graphical indicia, wherein each of the plurality of graphical indicia is representative of an acquired parameter of the plurality of acquired parameter comparing between the at least two shifts;

a status button that causes a status of the plurality of metal fabrication resources to be displayed on the user viewable dashboard page when selected;

a productivity button that causes one or more productivity parameters to be displayed on the user viewable dashboard page comparing between the at least two shifts when selected; and a goals button that causes at least one of the acquired parameters to be displayed relative to a stored goal for the acquired parameter on the user viewable dashboard page when selected.

29. The interface of claim 14, wherein the first subset of the acquired data corresponds to a first shift, a first department, or a first location, and wherein the second subset of the acquired data corresponds to a second shift, a second department, or a second location.

30. The interface of claim 29, wherein the graphical indicia of the user viewable dashboard page compare the first shift to the second shift, the first department to the second department, or the first location to the second location, with regard to welding proficiency, efficiency, or productivity, or any combination thereof.

* * * * *